United States Patent
Engvall et al.

(10) Patent No.: US 9,789,552 B2
(45) Date of Patent: Oct. 17, 2017

(54) SAW BLADE AND SAW BLADE TOOTH CONSTRUCTION

(71) Applicant: Irwin Industrial Tool Company, Huntersville, NC (US)

(72) Inventors: David Philip Engvall, Stanley, NC (US); Craig Davidson, Cornelius, NC (US)

(73) Assignee: IRWIN INDUSTRIAL TOOL COMPANY, Huntersville, NC (US)

( * ) Notice: Subject to any disclaimer, the term of this patent is extended or adjusted under 35 U.S.C. 154(b) by 216 days.

(21) Appl. No.: 14/310,064

(22) Filed: Jun. 20, 2014

(65) Prior Publication Data

US 2015/0000497 A1    Jan. 1, 2015

Related U.S. Application Data

(60) Provisional application No. 61/839,942, filed on Jun. 27, 2013.

(51) Int. Cl.
*B23D 61/04* (2006.01)
*B23D 65/00* (2006.01)

(52) U.S. Cl.
CPC ............ *B23D 61/04* (2013.01); *B23D 65/00* (2013.01); *Y10T 83/9319* (2015.04)

(58) Field of Classification Search
CPC ............ Y10T 83/9319; Y10T 83/9362; Y10T 83/9365; Y10T 83/9367; Y10T 83/935; Y10T 83/9353; Y10T 83/9355; Y10T 83/9358; Y10T 83/936; B23D 61/04; B23D 61/021; B23D 61/023
See application file for complete search history.

(56) References Cited

U.S. PATENT DOCUMENTS

| | | | | |
|---|---|---|---|---|
| 239,098 | A * | 3/1881 | Hill ........................ | B23D 61/06 83/839 |
| 3,004,902 | A * | 10/1961 | Beckner ................. | B01D 1/222 205/143 |
| 6,065,370 | A | 5/2000 | Curtsinger et al. | |
| 2002/0050196 | A1* | 5/2002 | Fluhrer .................. | B23D 61/04 83/13 |
| 2006/0207398 | A1* | 9/2006 | Nicolson ................ | B23D 61/04 83/13 |
| 2011/0197736 | A1* | 8/2011 | Lizzi ...................... | B23D 61/04 83/835 |

OTHER PUBLICATIONS

Demo Demon—The Ultimate 7-¼" × 24 Tooth Framing/Demolition Saw Blade; "No job is too tough for this extreme blade".

* cited by examiner

*Primary Examiner* — Phong Nguyen
(74) *Attorney, Agent, or Firm* — Eversheds Sutherland (US) LLP

(57) ABSTRACT

A saw blade includes a plate with teeth. A tip pocket is formed in each of the teeth where the tip pocket has a first end and a second end and a continuously curved surface between the first end and the second end. A tip has a back face shaped to match the continuously curved surface. A joint joins the tip to the plate where the joint extends for substantially the length of the surface of the tip pocket and the back face. The continuously curved surface may have a wave profile. A top face of the tip and a peripheral face of the tooth may be coplanar.

20 Claims, 14 Drawing Sheets

SAW BLADE AND SAW BLADE TOOTH CONSTRUCTION

This application claims benefit of priority under 35 U.S.C. §119(e) to the filing date of U.S. Provisional Application No. 61/839,942, as filed on Jun. 27, 2013, which is incorporated herein by reference in its entirety.

BACKGROUND

The invention relates to circular saw blades. Circular saw blades typically comprise a circular plate having a plurality of teeth mounted about the periphery of the plate that may be designed to cut through a variety of materials when the plate is rotated at high speed. The saw blade typically comprises a center aperture that may be releasably mounted on the arbor of a circular saw.

SUMMARY

In some embodiments, a saw blade comprises a plate defining at least one tooth. A tip pocket is formed in the tooth where the tip pocket has a first end and a second end and a continuously curved surface between the first end and the second end. A tip has a back face shaped to match the continuously curved surface. A joint joins the tip to the plate along the length of the curved surface and the back face.

The plate may be circular. A plurality of teeth may be formed about the periphery of the plate. The tip may have a top face and the tooth may have a peripheral face where the top face and the peripheral face are coplanar. The tooth may extend to the distal end of the back face. The curved surface may be arcuate. The curved surface may be formed as an arc of a circle. The joint may be a brazed or welded joint.

In some embodiments, a saw blade comprises a plate defining at least one tooth. A tip pocket is formed in the tooth where the tip pocket has a first end and a second end and a continuously curved surface formed with a wave profile between the first end and the second end. A tip has a back face shaped to match the continuously curved surface with the wave profile. A joint joins the tip to the plate along the length of the curved surface and the back face.

The plate may be circular. A plurality of teeth may be formed about the periphery of the plate. The tip may have a top face and the tooth may have a peripheral face where the top face and the peripheral face are coplanar. The tooth may extend to the distal end of the back face. The wave surface may comprise at least one rounded trough and at least one rounded peak. The wave surface may comprise a plurality of rounded troughs and a plurality of rounded peaks. The joint may be a brazed or welded joint.

In some embodiments, a method of making a saw blade comprises forming a plate defining at least one tooth; forming a tip pocket in the tooth, the tip pocket having a first end and a second end and a continuously curved surface between the first end and the second end; forming a tip having a back face shaped to match the continuously curved surface; brazing the tip to the plate; and forming a top face on the tip to create a cutting edge and a peripheral face on the tooth where the peripheral face extends to the distal end of the top face.

The method may comprise forming the top face and the peripheral face by grinding. The method may comprise forming the top face and the peripheral face simultaneously. The peripheral face may be coplanar with the top face.

DETAILED DESCRIPTION OF EMBODIMENTS OF THE INVENTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Referring to FIGS. 1-4 and 9-14 in one embodiment, the saw blade 1 comprises a circular saw blade having a plurality of teeth 2 disposed about the periphery of the blade. The saw blade may comprise a relatively flat circular plate 4 having a plurality of teeth 2 forming a cutting edge and a centrally disposed aperture 5 for receiving the arbor of a rotary saw. The diameter of the blade may vary and the number of teeth disposed about the periphery of the blade may vary for different applications. The teeth 2 may be formed by radial projecting areas of the plate 4 and may be defined by a gullet 6 in front of each tooth 2 that facilitates chip removal. The plate 4 that forms the blade is typically made of hardened steel or other similar hard, durable material.

Each tooth 2 further comprises a tip 10 that is permanently secured to the end of each tooth 2. The tip 10 is typically formed of a harder material than the plate 4 and in some embodiments may comprise carbide. The tips 10 comprise the cutting edges of the saw blade. In some applications, it has been discovered that existing tip/blade joints may fail. In some circumstances, the tip may fail, in other circumstances the plate may fail and in still other circumstances the braze joint between the tip and the plate may fail. In tests the inventors discovered that tip failure is particularly problematic when, for example, the tips strike a nail embedded in wood. The situation may be particularly acute where the nail is loosely retained in the wood. The tip and tip pocket configuration as described herein lessens blade failure even where the blade impacts objects such as embedded nails.

Referring to FIGS. 1-4 and 9-14, the tip 10 is held in a tip pocket 12 formed at the distal end of the tooth 2. As used herein, the terms "proximate" and "distal" refer to the location of an element relative to the center of the blade such that a proximate element is closer to the center of the blade and a distal element is closer to the periphery of the blade. The tip 10 is located immediately behind the gullet 6 and forms the leading edge of the tooth. The leading edge of the tooth 2 is the edge that leads the tooth into the material being cut. In one embodiment, the tip pocket 12 is formed with a continuously smoothly curved or arcuate surface between the first proximate end 12a and the second distal end 12b of the pocket 12. The curve of the surface may be formed as an arc of a circle; however, the curve of the surface may have other arcuate or curved shapes provided that the surface of the tip pocket and the mating back face of the tip do not have sharp corners or extended linear surfaces. The curve forms a relatively deep pocket such that the length of the pocket between the ends 12a, 12b along the curved surface is longer than in existing saw blades that have a rectangular or L-shaped pocket. In one embodiment, the curve may be formed as an arc of a circle having a radius of approximately 2.5-2.75 mm.

The tip is formed with a back face 14 that has a profile that matches the shape of the surface of the tip pocket 12 such that the back face 14 abuts the tip pocket 12 over substantially the entire length of the pocket 12 and the back face 14. For example, where the tip pocket 12 has a continuous curved surface the back face 14 has a mating continuous curve, and where the curved surface of the tip pocket is an arc of a circle the back face 14 has a mating curve formed as an arc of the circle.

Figures 1, 2, 3, 4:
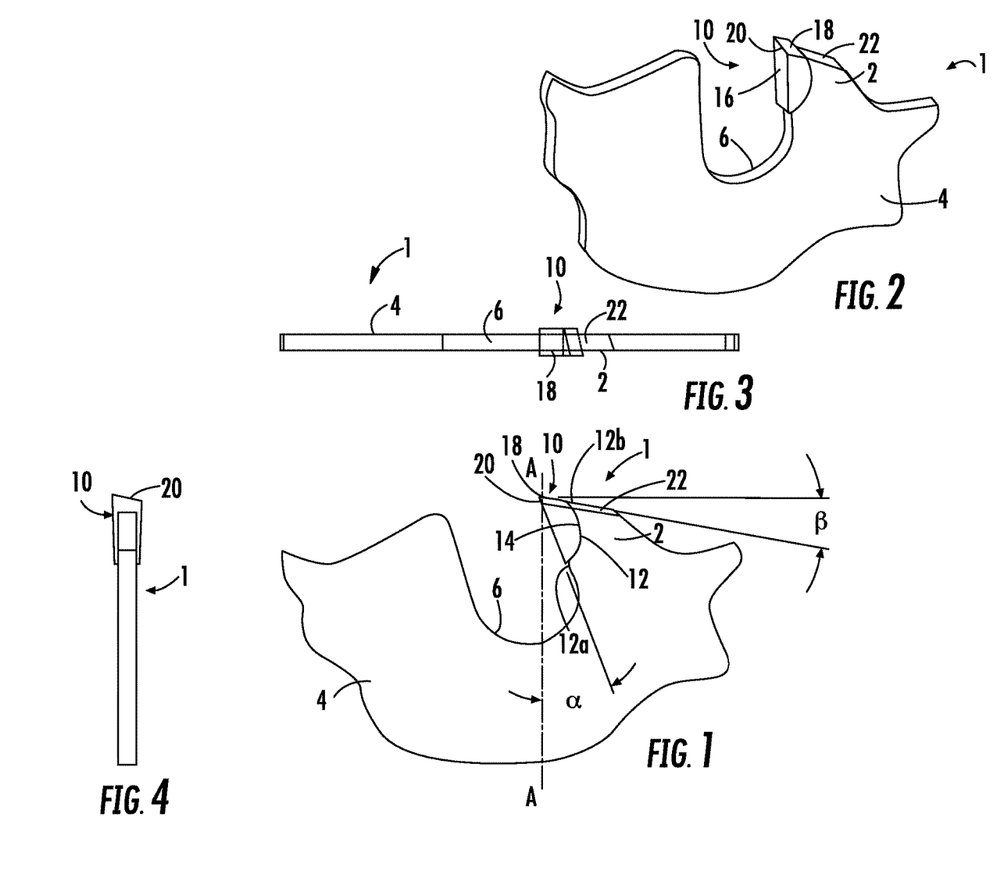
FIG. 1 is a partial view of a saw blade showing an embodiment of the tip and tip pocket of the invention.
FIG. 2 is a perspective view similar to FIG. 1.
FIG. 3 is a top view of FIG. 1.
FIG. 4 is an end view of FIG. 1.
Figure 5:
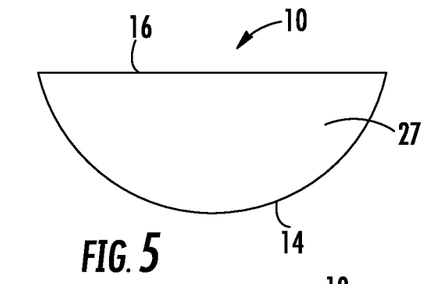
FIG. 5 is a plan view of a tip usable in the saw blade of FIG. 1.
Figure 6:
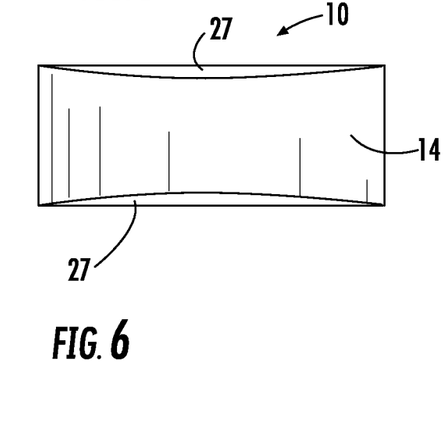
FIG. 6 is a top view of the tip of FIG. 5.
Figure 7:
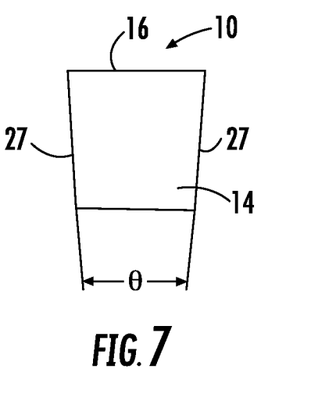
FIG. 7 is an end view of the tip of FIG. 5.
Figure 8:
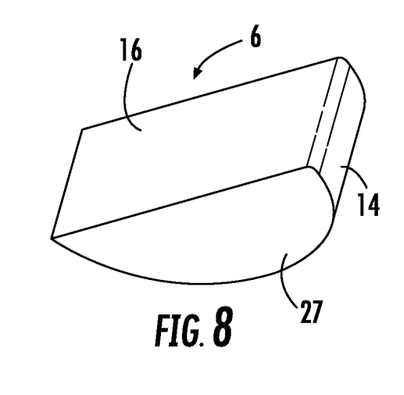
FIG. 8 is a perspective view of the tip of FIG. 5.
Figure 9:
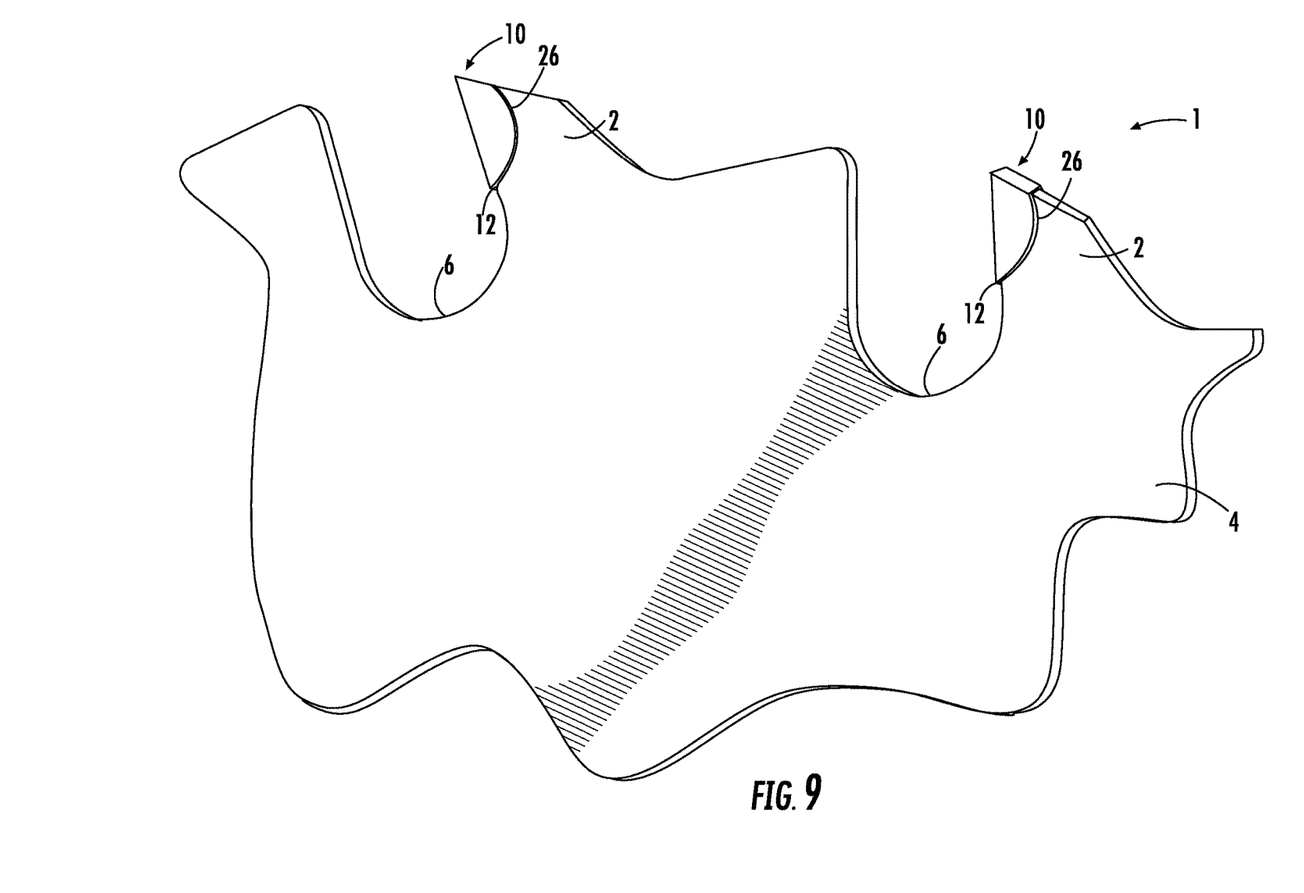
FIG. 9 is another partial perspective view of the embodiment of FIG. 1.
Figure 10:
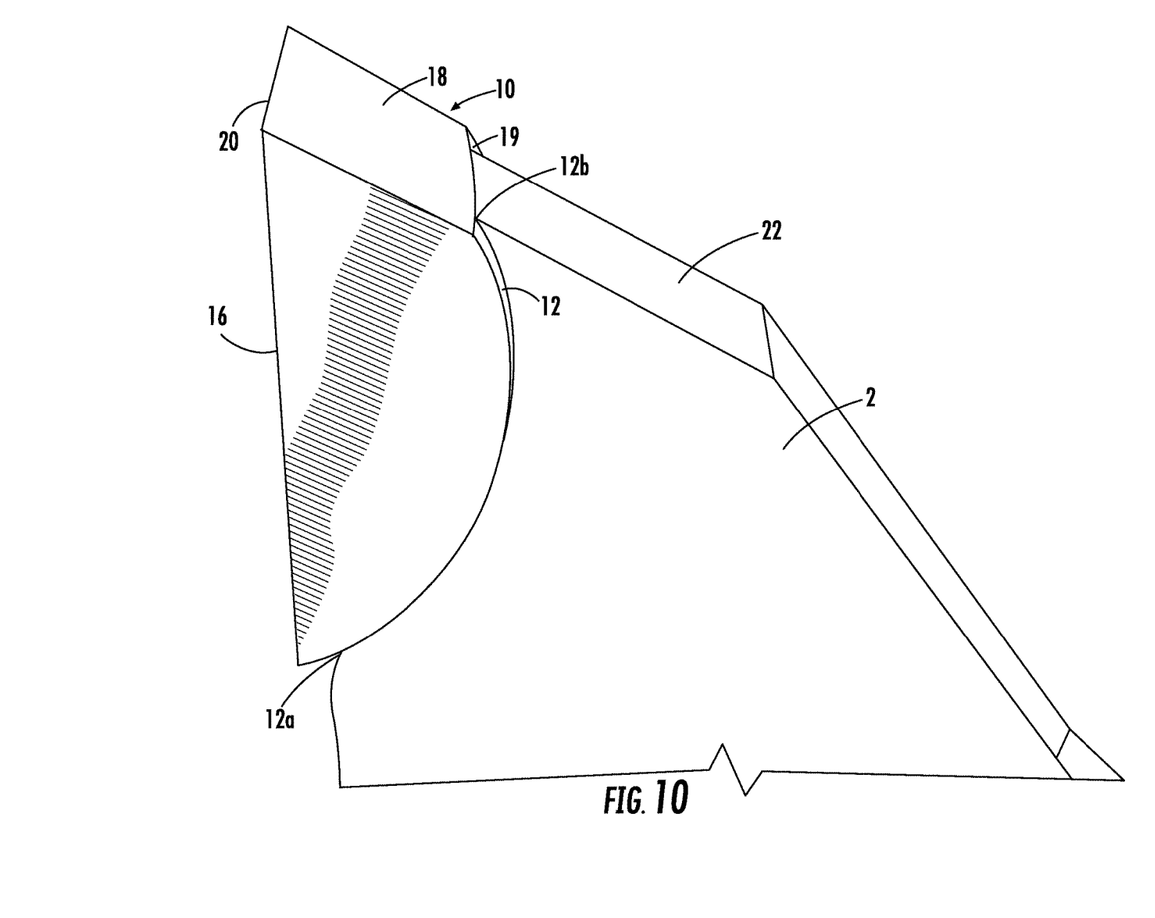
FIG. 10 is a detailed partial perspective view of the embodiment of FIG. 1.
Figure 11:
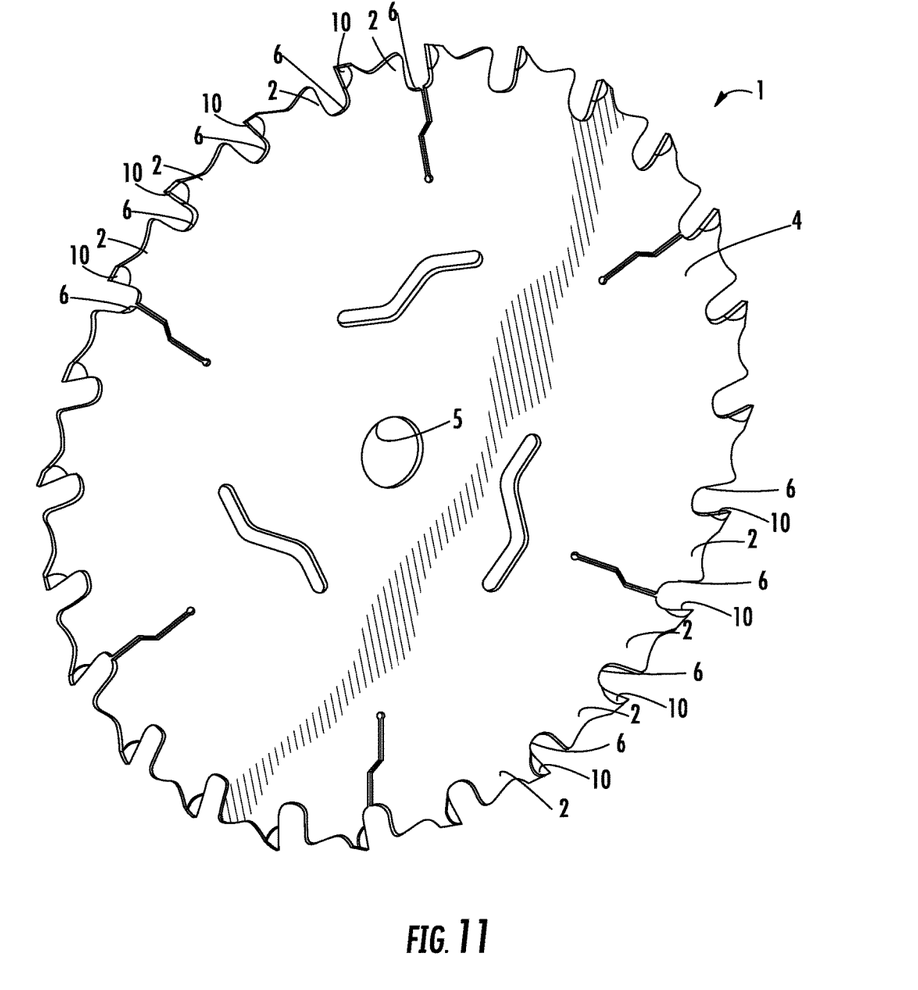
FIG. 11 is a perspective view of an embodiment of the saw blade of the invention with the embodiment of the tip and tip pocket of FIG. 1.
Figures 12, 13:
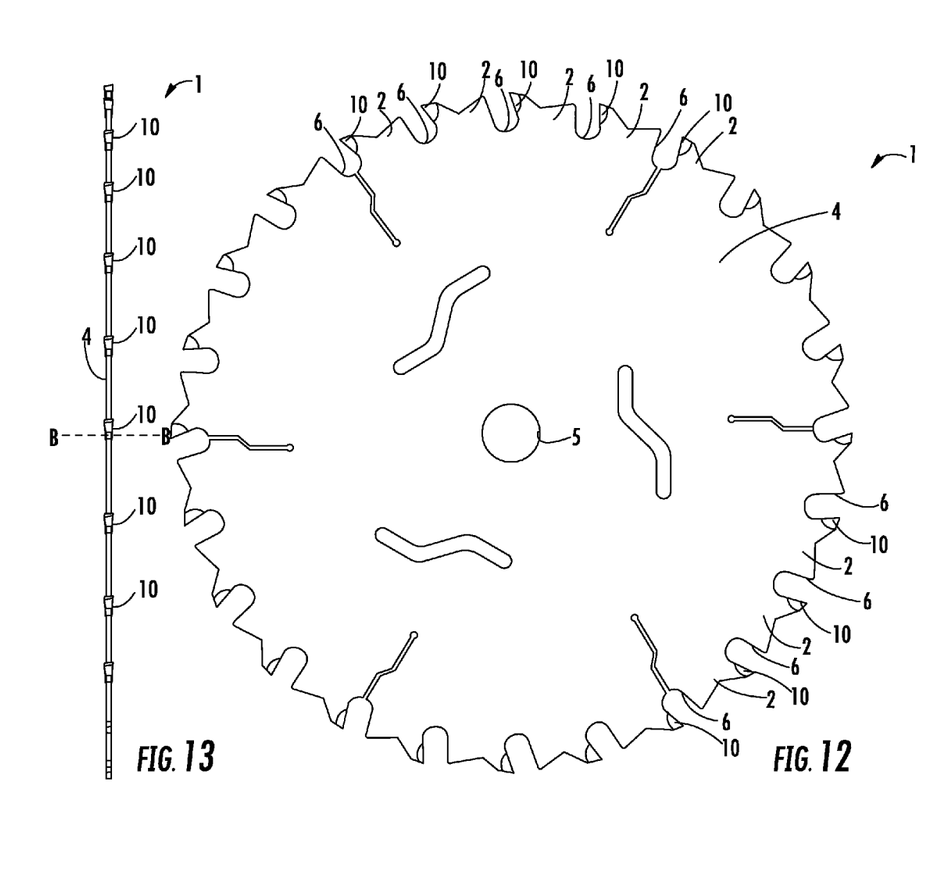
FIG. 12 is a plan view of the saw blade of FIG. 11.
FIG. 13 is an end view of the saw blade of FIG. 11.
Figure 14:
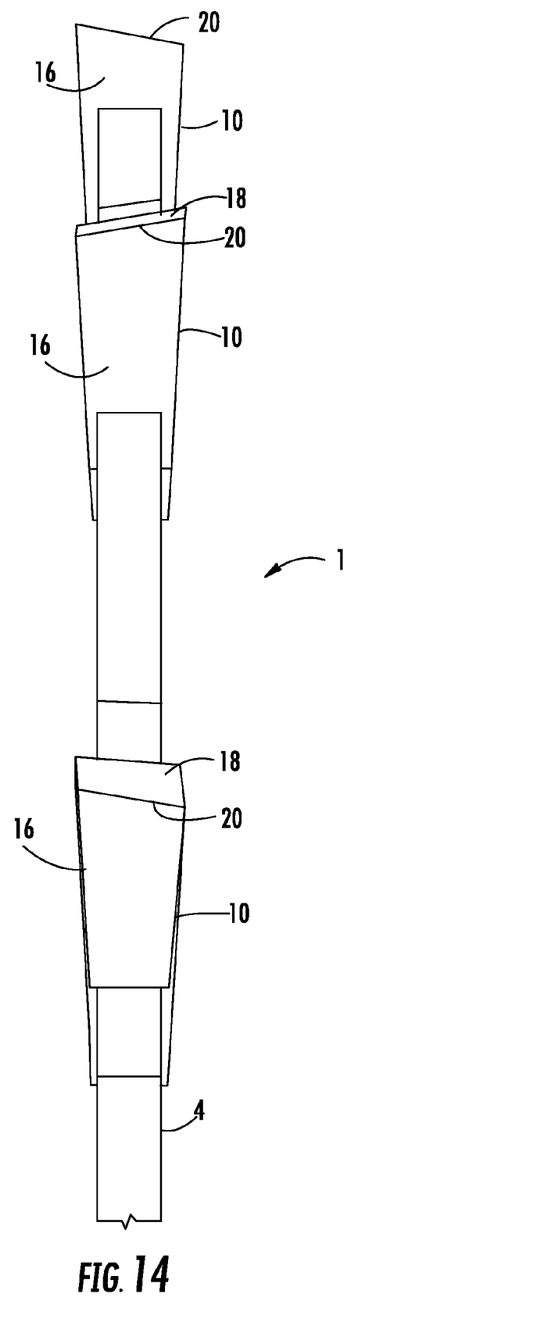
FIG. 14 is a detailed end view of the saw blade of FIG. 11.
Figure 15:
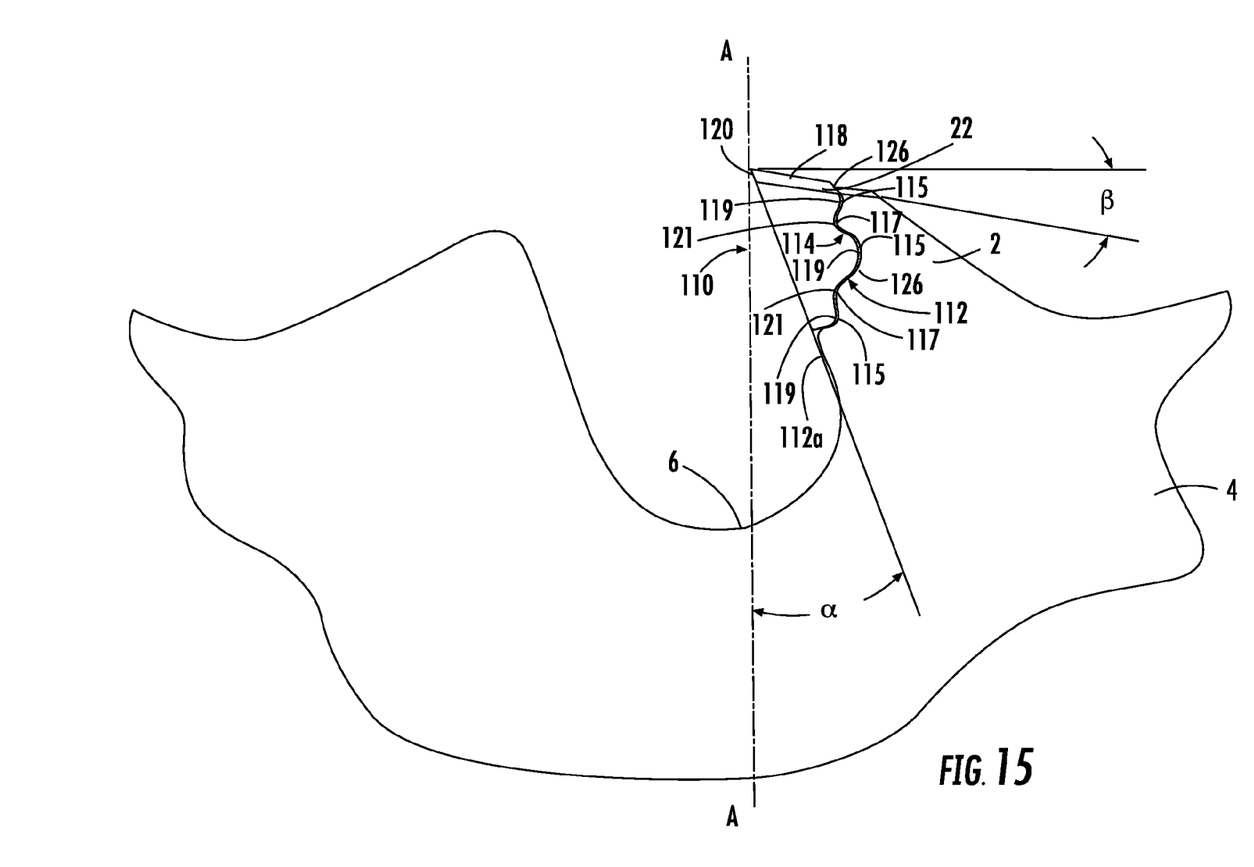
FIG. 15 is a partial view of a saw blade showing another embodiment of the tip and tip pocket of the invention.
Figure 16:
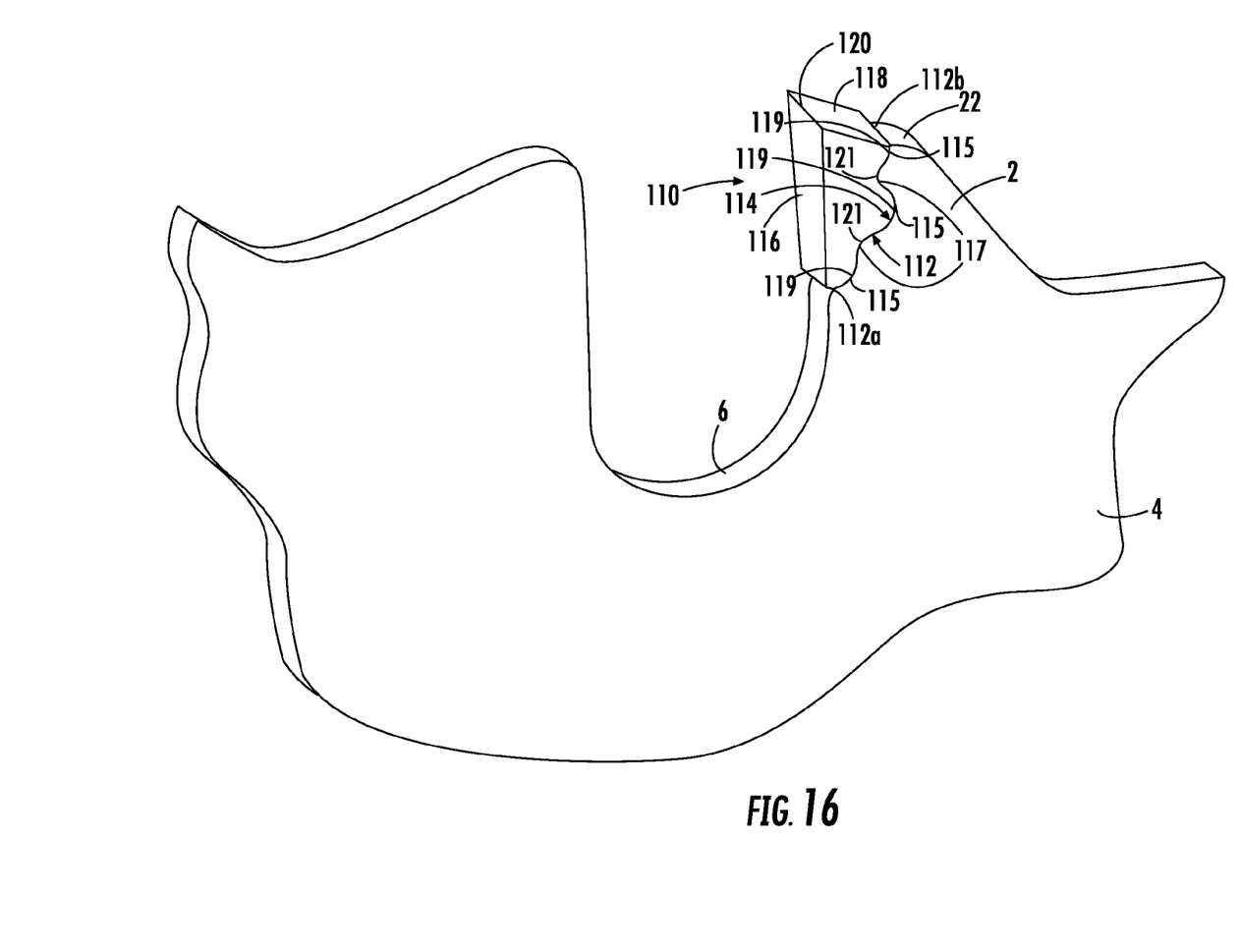
FIG. 16 is a perspective view similar to FIG. 15.
Figure 17:
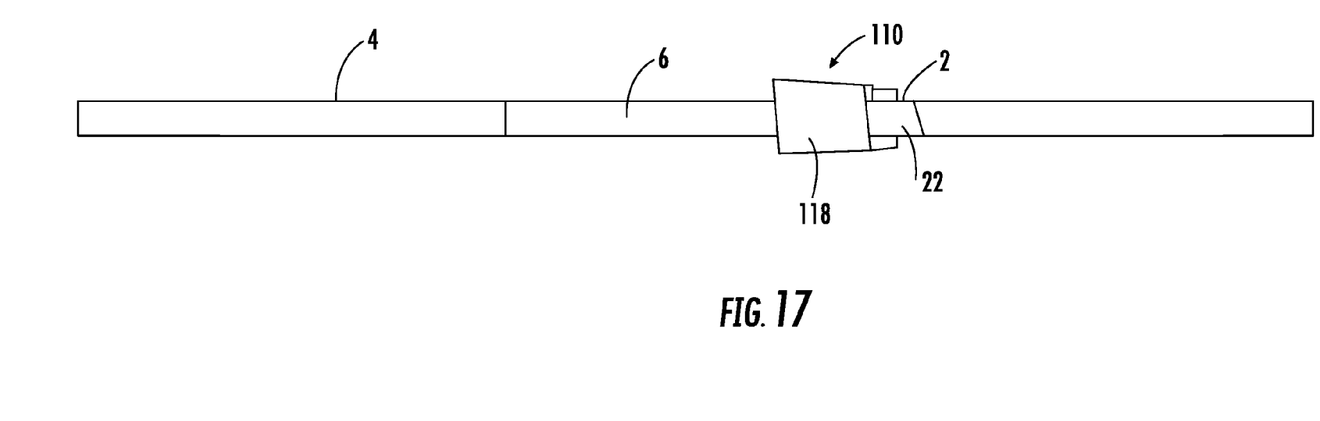
FIGS. 17 and 18 are end views of the saw blade of FIG. 16.

The tip 10 has a front face 16 that extends from the bottom of the back face 14 and a top face 18 that extends from the top of the back face 14. The front face 16 and the top face 18 meet at a relatively sharp cutting edge 20. Typically the top face 18 is ground into the tip after the tip is joined to the plate to form the cutting edge 20. In one embodiment, the top face 18 of the tip 10 and the peripheral face 22 of the tooth 2 immediately behind the tip 10 are in the same plane such that the tooth 2 extends to the distal end of the back face 14 and supports the tip 10 along the entire length of the back face 14 up to the top face 18. The coplanar arrangement of the top face 18 and the peripheral face 22 may be created by grinding the top face 18 and the peripheral face 22 simultaneously in a single grinding operation although the top face and peripheral face may be formed in separate processes. In one embodiment, the front face 16 is disposed at an angle $\alpha$ of approximately 20 degrees relative to a radial line A-A that extends through the cutting edge 20 and the top face 18 extends at an angle $\beta$ of approximately 10 degrees to a line perpendicular to a line A-A. The cutting edge 20 has an inside angle between the front face 16 and the top face 18 of approximately 60 degrees. The tooth 2 may be formed with a bevel edge as shown in FIGS. 4 and 14 where the cutting edge 20 extends at an angle relative to the rotational axis B-B (see, FIG. 13) of the blade. The bevel angle may alternate between adjacent tips such that adjacent tips are angled opposite to one another.

In some embodiments, the tip 10 may be brazed to the plate 4. The braze joint 26 extends along substantially the entire length of the pocket 12 and the back face 14 between the proximate and distal ends of the pocket 12 and the proximate and distal end of the back face 14. The braze joint extends between the mating abutting surface of the pocket and the back face of the tip. The inventors have determined that a tip and pocket having mating arcuate or smoothly curving surfaces provides a tip/plate joint that is substantially stronger than in existing saw blades and is not as prone to failure as existing saw blades. It is believed that the improvement in tip/plate integrity results from a combination of factors. The use of the arcuate or smoothly curving surface of the tip pocket 12 and mating back face 14 increases the surface area contact between the tip and the plate (as compared to rectilinear tip pockets that have a generally L-shape) without increasing the height of the tip such that there is a greater braze area between the tip and the plate. Extending the peripheral face 22 of the tooth 2 to the distal end of the back face 14 provides support along the entire length of the back face of the tip such that the end of the tip does not extend beyond the periphery of the tooth. The use of the mating arcuate or smoothly curved surfaces also may eliminate high stress points that may occur when the tip/pocket has a more rectilinear shape as found in existing saw blades. Further, with the rectangular tips of existing saw blades, the tip is in both shear and compression such that the braze joint cannot deflect. With the arcuate or smoothly curved shape of the joint of the invention, the stresses are developed over the entire braze or weld. Because the carbide of the tip and the plate are both stiffer than the relatively softer braze joint, the braze joint 26 may act as a "cushion" where the stresses are spread over the entire area of the curved braze joint. While the tip/plate joint provides a more durable tip that is less prone to failure than existing saw blade tips, reasons other than, or in addition to, those described above may account for the improved performance. In other embodiments, the tip 10 may be welded to the plate 4.

In some embodiments, the tip 10 may be formed as shown in FIGS. 5-8 (shown before grinding) where the tip has a planar front face 16 that is joined to an arcuate or smoothly curved back face 14. Side faces 26-28 may join the front and back faces where the side faces diverge from one another at approximately an angle $\theta$ of approximately 10 degrees from the back face 14 to the front face 16. The back face 14 is brazed to the mating tip pocket 12 on the tooth 2 to secure the tip 10 to the plate 4. After the tip 10 is secured to the plate 4, the top face 18 may be ground into the tip 10 and the peripheral face 22 may be ground into the tooth 2 such that these faces are coplanar. The top face 18 and the peripheral face 22 may be ground simultaneously in a single grinding operation. The grind extends into the plate 4 such that the top face 18 of the tip 10 and the peripheral face 22 of the tooth 2 are in the same plane. Tooth 2 extends to the distal end of the back face 14 such that the tip 10 is supported along the entire length of the back surface 14 to the top face 18. When the top face 18 is ground, the sharp cutting edge 20 between the top face 18 and the front face 16 is formed.

Another embodiment of the saw blade of the invention is shown in FIGS. 15-18 and 23-25. The same reference numerals are used to identify like elements previously described with respect to the embodiment of FIGS. 1-14. As previously described, the saw blade may comprise a relatively flat plate 4 having a plurality of teeth 2 forming a cutting edge and a centrally disposed aperture 5 for receiving the arbor of a rotary saw. The teeth 2 may be formed by radial projecting areas of the plate 4 and may be defined by a gullet 6 in front of each tooth 2 that facilitates chip removal. The plate 4 that forms the blade is typically made of hardened steel or other similar durable material.

Each tooth 2 further comprises a tip 110 that is permanently secured to the end of each tooth 2. The tip 110 is typically formed of a harder material than the plate 4 and in some embodiments may comprise carbide. The tip 110 is held in a tip pocket 112 formed at the leading edge of the tooth 2. In this embodiment, the tip pocket 112 is formed with a continuously curved or arcuate surface between the first proximate end 112a and the second distal end 112b of the pocket 112. However, the curved surface, rather than being formed as a smooth surface that follows the arc of the curve, is formed as a waved or undulating surface. The surface of the tip pocket generally follows an arc of a circle with the wave surface following the curve of the arc. The wave surface is formed as a series of smooth, rounded troughs 115 and peaks 117. The troughs and peaks may have a radius of curvature of approximately 0.5-0.6 mm. The surface is continuously curved without any sharp corners or linearly extending flat surfaces with the peaks and troughs being rounded and the transitions between the peaks and troughs being smooth. The surface of the pocket forms a relatively deep pocket such that the length of the pocket between the ends 112a, 112b along the surface is longer than in existing saw blades. In this embodiment, the surface area of the tip pocket and tip is increased by making the pocket surface with a wave shape. The surface area between the first proximate end 112a and the second distal end 112b of the pocket 112 along the back face of the tip and the surface of the tip pocket is greater than in the previous embodiment because the wave surfaces provides a longer path between the first end 112a and the second end 112b of the pocket 112.

Figure 18:
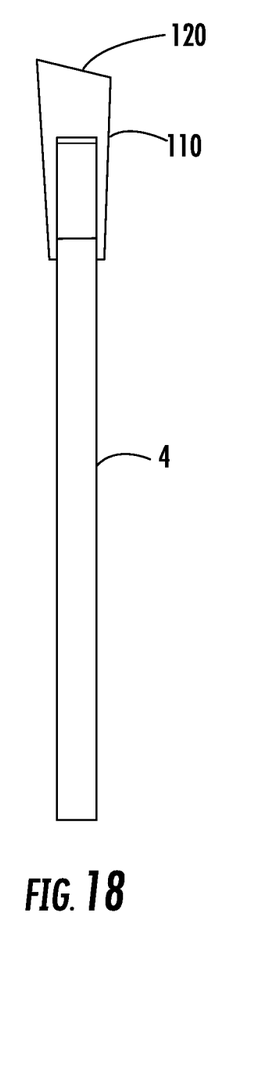
Figure 19:
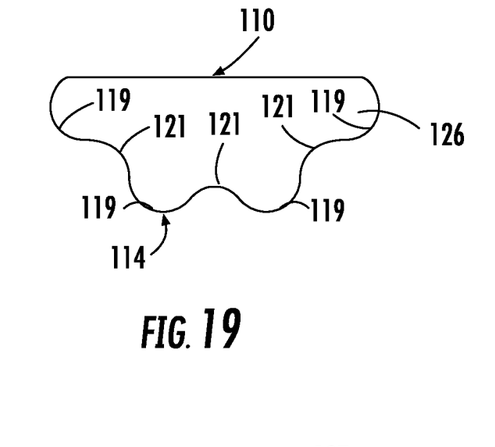
FIG. 19 is a plan view of a tip usable in the saw blade of FIG. 15.
Figure 20:
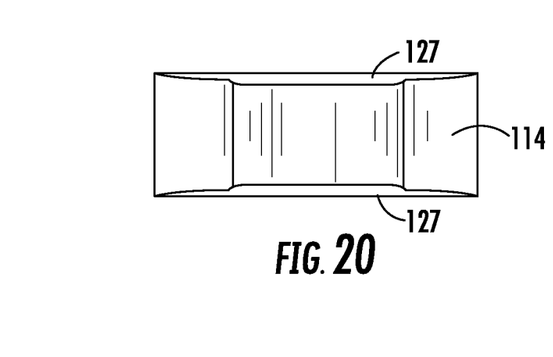
FIG. 20 is a top view of the tip of FIG. 19.
Figure 21:
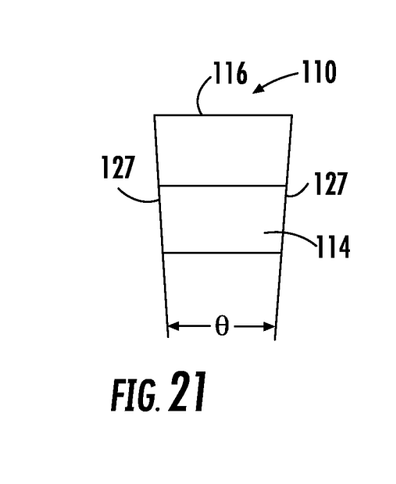
FIG. 21 is an end view of the tip of FIG. 19.
Figure 22:
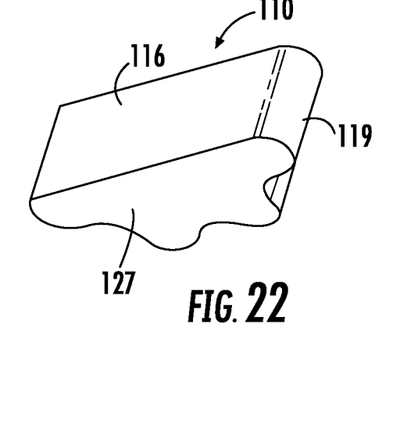
FIG. 22 is a perspective view of the tip of FIG. 19.
Figure 23:
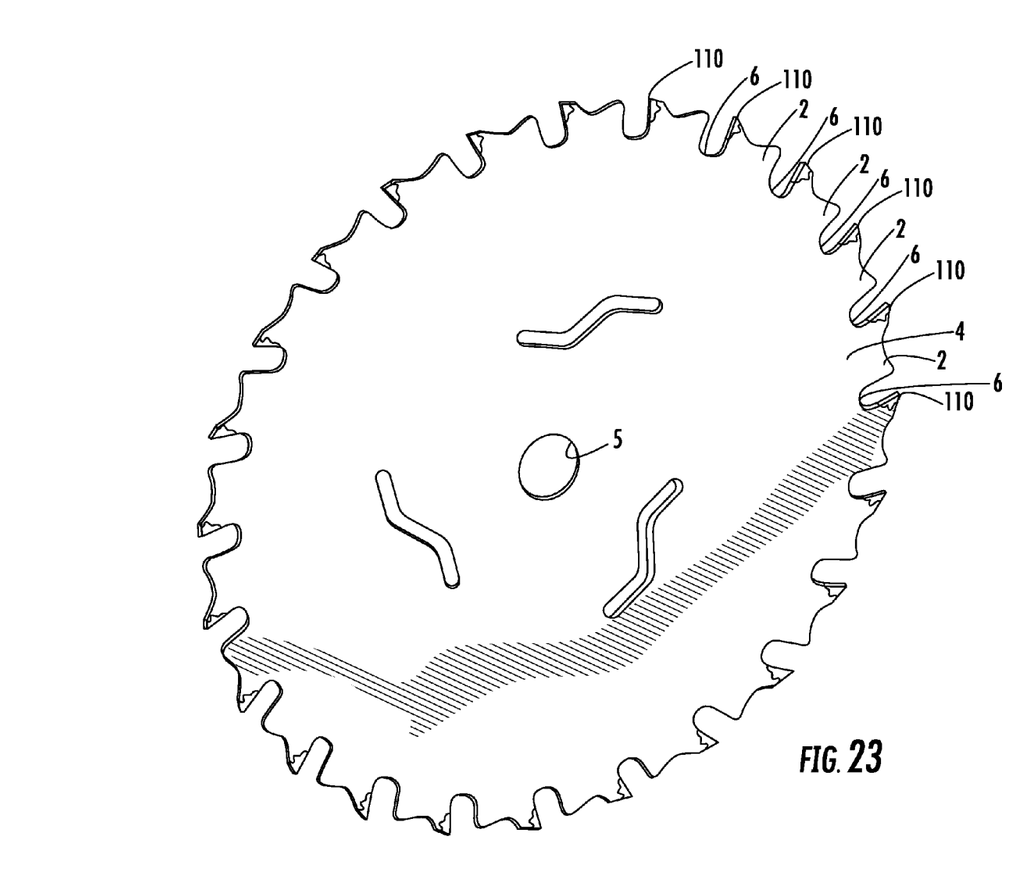
FIG. 23 is a perspective view of an embodiment of the saw blade of the invention with the embodiment of the tip and tip pocket of FIG. 15.
Figures 24, 25:
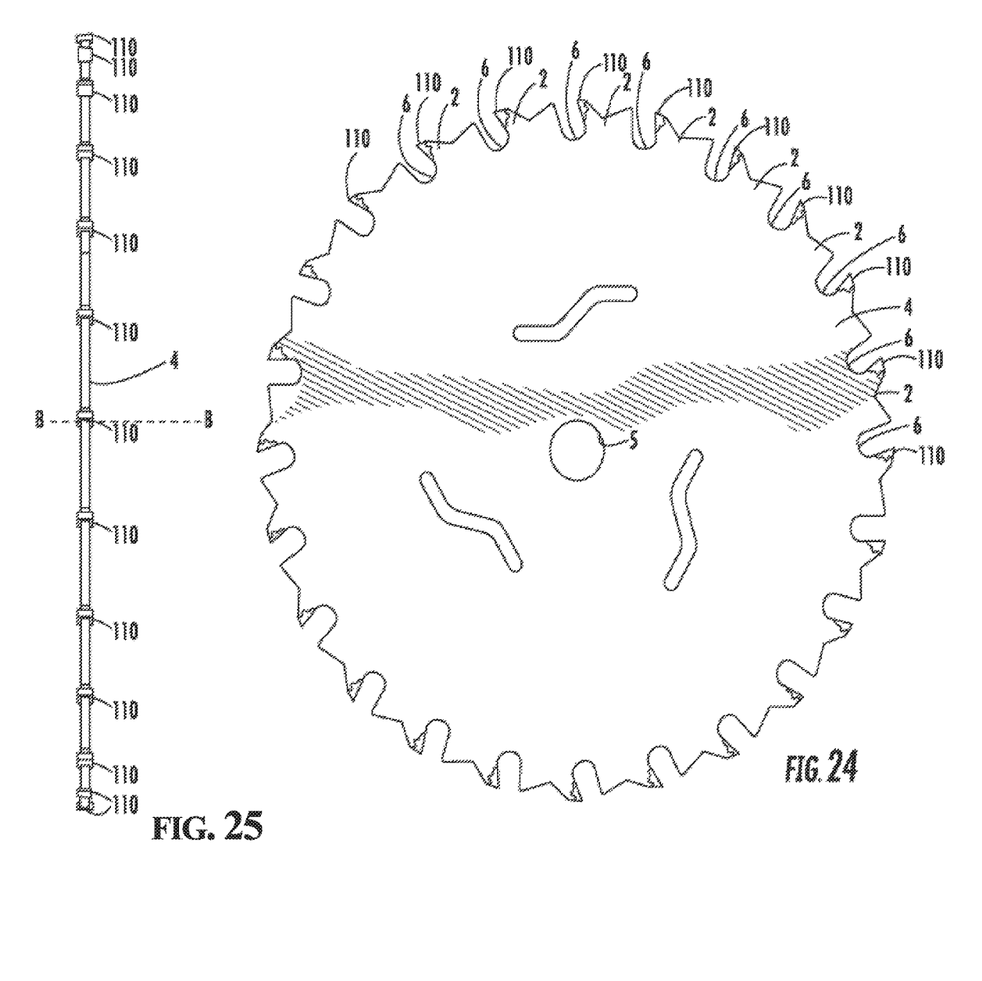
FIG. 24 is a plan view of the saw blade of FIG. 15.
FIG. 25 is an end view of the saw blade of FIG. 15.

The tip is formed with a back face 114 that has a profile that matches the shape of the surface of the tip pocket 112 such that the back face 114 abuts the surface of the tip pocket 112 over substantially the entire length of the tip pocket 112 and the back face 114. The back face 114 has peaks 119 and troughs 121 that mate with the peaks 117 and troughs 115 of pocket 112. The tip 110 has a front face 116 that extends from the proximate end of the back face 114 and a top face 118 that extends from the distal end of the back face 114. The front face 116 and the top face 118 meet at a relatively sharp cutting edge 120. In one embodiment, the top face 118 of the tip 110 and the peripheral face 22 of the tooth 2 immediately behind the tip 110 are in the same plane such that the tooth 2 extends to the distal end of the back face 114 and supports the tip 110 along substantially the entire length of the back face 114 to the top face 118. In one embodiment, the front face 116 is disposed at an angle $\alpha$ of approximately 20 degrees relative to a radial line A-A that extends through the cutting edge and the top face 118 extends at an angle $\beta$ of approximately 10 degrees to a line perpendicular to a line A-A as previously described with reference to FIG. 1. The tooth 2 may be formed with a bevel edge as shown in FIG. 18 where the cutting edge 120 extends at an angle relative to the rotational axis B-B (see FIG. 25) of the blade. The bevel angle may alternate between adjacent tips such that adjacent tips are angled opposite to one another.

In some embodiments, the tip 110 may be brazed to the plate 4 as previously described. The braze joint 126 extends along substantially the entire length of the pocket 112 and the back face 114 of the tip 110. The use of the arcuate tip pocket with the wave surface further increases the surface area contact between the tip and the plate without increasing the height of the tip such that there is a greater braze area between the tip and the plate. Extending the tooth peripheral face 22 to the distal end of the back face 14 provides support along the entire length of the back face of the tip to the top face 118 such that the back surface of the tip does not extend beyond the periphery of the tooth. In other embodiments, the tip 110 may be welded to the plate 4.

In some embodiments, the tip 110 may be formed as shown in FIGS. 19-22 where the tip has a planar front face 116 that is joined to an arcuate or smoothly curved back face 114. The back face 114 is formed with a plurality of peaks 119 and troughs 121. Side faces 127 may join the front and back faces where the side faces diverge from one another at an angle $\theta$ of approximately 10 degrees from the back face 114 to the front face 116. The back face 114 is brazed to the mating tip pocket 112 on the tooth 2 to secure the tip 110 to the plate 4. After the tip 110 is secured to the plate 4, the top face 118 is ground into the tip 110 and the peripheral face 22 is ground into the tooth 2 such that these faces are coplanar as previously described.

The tip and pocket as described herein use curved mating surfaces to increase the surface area of the brazed or welded joint between the tip and the pocket. The curve is formed to increase the surface area without increasing the height of the tip (the distance between the proximate and distal ends of the tip). The distance the pocket traverses and, therefore, the surface area between the pocket and the back face of the tip, may be increased by changing the shape of the curve. For example, the surfaces may be provided with a variable radius such that the actual distance between the ends of the pocket (and between the ends of the back face of the tip) over the surface of the pocket is increased relative to the linear distance between the ends of the pocket (and between the ends of the back face of the tip).

Although specific embodiments have been shown and described herein, those of ordinary skill in the art will appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:
1. A method of making a saw blade comprising:
    forming a plate defining at least one tooth;
    forming a tip pocket in the tooth, the tip pocket having a first end and a second end and a continuously curved surface comprising a first wave profile comprising a first plurality of peaks and troughs positioned along a front face of the tooth, facing a direction of rotation of the saw blade, and extending between the first end and the second end;
    forming a tip comprising:
        a cutting edge;

a back face comprising a proximate end and a distal end and a second curved surface comprising a second wave profile comprising a second plurality of peaks and troughs facing a second direction opposite of the direction of rotation of the saw blade and extending from the proximate end to the distal end and shaped to match the continuously curved surface of the tip pocket;

a front face extending from the proximate end of the back face; and a top face extending from the distal end of the back face to the front face;

brazing the tip to the plate; and forming the top face on the tip to create the cutting edge and a peripheral face on the tooth.

2. The method of claim 1 wherein the top face and the peripheral face are formed by grinding.

3. The method of claim 1 wherein the top face and the peripheral face are formed simultaneously.

4. The method of claim 1 wherein the peripheral face is coplanar with the top face.

5. A tooth tip configured to be insertable into a tip pocket of a tooth of a saw blade, the tooth tip comprising:

a cutting edge;

a back face comprising a proximate end and a distal end and a second curved surface comprising a second wave profile comprising a second plurality of peaks and troughs extending from the proximate end to the distal end and shaped to match a first continuously curved surface of the tip pocket, wherein the second wave profile comprising the second plurality of peaks and troughs is configured to face a second direction opposite a direction of rotation of the saw blade when the tooth tip is inserted into the tip pocket of the tooth;

a front face extending from the proximate end of the back face; and a top face extending from the distal end of the back face to the front face.

6. The tooth tip of claim 5, wherein the front face is disposed at an approximately 20 degree positive angle, wherein the top face slopes downward from a front end to a distal rear end at approximately 10 degrees.

7. A saw blade comprising:

a plate defining at least one tooth;

a tip pocket formed in the tooth, the tip pocket having a first end and a second end and a continuously curved surface comprising a first wave profile comprising a first plurality of peaks and troughs positioned along a front face of the tooth, facing a direction of rotation of the saw blade and extending between the first end and the second end;

a tip comprising:

a cutting edge;

a back face comprising a proximate end and a distal end and a second curved surface comprising a second wave profile comprising a second plurality of peaks and troughs facing a second direction opposite of the direction of rotation of the saw blade and extending from the proximate end to the distal end and shaped to match the continuously curved surface of the tip pocket;

a front face extending from the proximate end of the back face; and a top face extending from the distal end of the back face to the front face; and a joint joining the tip to the plate where the joint extends for substantially the length of the surface of the tip pocket and the back face.

8. The saw blade of claim 7 wherein the plate is circular.

9. The saw blade of claim 8 wherein a plurality of teeth are formed about the periphery of the plate.

10. The saw blade of claim 7 wherein the tooth has a peripheral face where the top face of the tip and the peripheral face are coplanar.

11. The saw blade of claim 7 wherein the tooth extends to the distal end of the back face.

12. The saw blade of claim 7 wherein the curved surface is arcuate.

13. The saw blade of claim 7 wherein the curved surface is formed as an arc of a circle.

14. The saw blade of claim 7 wherein the joint is one of a brazed joint and a welded joint.

15. A saw blade comprising:

a plate defining at least one tooth;

a tip pocket formed in the tooth, the tip pocket having a first end and a second end and a continuously curved surface defining a wave profile comprising a first plurality of peaks and troughs positioned along a front face of the tooth, facing a direction of rotation of the saw blade and extending between the first end and the second end;

a tip comprising:

a cutting edge; and a back face comprising a proximate end and a distal end and a second curved surface comprising a corresponding wave profile comprising a second plurality of peaks and troughs facing a second direction opposite of the direction of rotation of the saw blade and extending from the proximate end to the distal end and shaped to match the continuously curved surface of the tip pocket; and a joint joining the tip to the plate where the joint extends for substantially the length of the surface of the tip pocket and the back face.

16. The saw blade of claim 15 wherein the plate is circular.

17. The saw blade of claim 16 wherein a plurality of teeth are formed about the periphery of the plate.

18. The saw blade of claim 15 wherein the tip further comprises a top face and the tooth further comprises a peripheral face wherein the top face and the peripheral face are coplanar.

19. The saw blade of claim 15 wherein the tooth extends to the distal end of the back face.

20. The saw blade of claim 15 wherein the joint is one of a brazed joint and a welded joint.

* * * * *